June 6, 1967 E. L. HUFFMAN 3,323,652
MULTIMEMBRANE APPARATUS FOR DEMINERALIZING LIQUIDS
Filed March 20, 1963

INVENTOR
EVERETT L. HUFFMAN
BY Ernest S. Cohen
Gersten Sadowsky
ATTORNEYS

3,323,652
MULTIMEMBRANE APPARATUS FOR DEMINERALIZING LIQUIDS

Everett L. Huffman, Birmingham, Ala., assignor to the United States of America as represented by the Secretary of the Interior
Filed Mar. 20, 1963, Ser. No. 266,767
4 Claims. (Cl. 210—321)

The invention herein described and claimed may be manufactured and used by or for the Government of the United States of America for governmental purposes without the payment of royalties thereon or therefor.

This invention relates to improvements in liquid distribution devices of a liquid purification unit having particular utility in electrochemical processes for the demineralization of liquids. One form of this unit comprises a multiplicity of thin-walled, narrow envelope-like cells, or compartments in which flow liquid solutions channeled thereto through specially shaped inlet and outlet elements constituting the improved devices, which are arranged and maintained in the unit so they also function as spacers and clamps among the walls of the compartments. The unit according to the invention can be beneficially applied to carry out either electrodialysis or osmionic demineralization treatments of liquid solutions. As disclosed in U.S. Patent No. 2,758,083 issued Aug. 7, 1956, to Van Hoek et al., electrodialysis employs an external electromotive force applied in series across ion-selective membranes forming separate compartments through which the appertaining solutions flow. Dissolved solids are removed from solution by forcing such solids through the membranes of the compartments in which the solution is being purified into adjacent compartments in which a solution is being enriched. Osmionic demineralization of solutions involves essentially the same procedures with the exception that an external electromotive force is not required. Instead use is made of the difference in concentrations between two solutions as a source of energy to remove the solids from the solution being purified. For a detailed disclosure of this phenomenon attention is directed to U.S. Patent No. 2,947,688, issued on Aug. 2, 1960, to G. W. Murphy.

To promote economical utilization of electrodialysis apparatus requires that the electrical energy expended for the demineralization of its electrolyte solutions be decreased. However, placing a direct current voltage across the cells or compartments of such an apparatus, passes the voltage through the membrane walls thereof which are in contact with electrolyte solutions, giving rise to polarization effects at the surface of these membranes making likely the need for increased electrical energy. Accompanying polarization are changes in the pH of the electrolyte solution with resultant damage to the membranes, as well as a decrease in the concentration of the electrolytes in the liquid adjoining the membrane surfaces which lowers the allowable current densities applicable for the electrodialysis. Polarization occurs because the current coming to a membrane-solution interface is limited by the rate at which ions can diffuse from the bulk of the solution to the interface. Consequently, a most significant factor in controlling polarization is achieving an appropriate flow velocity for the electrolyte solution passing through the compartments formed by the membrane walls. Obstructed or decreased flow of solution in one compartment of a unit brings about polarization in that compartment at current densities that do not affect the other compartments of the unit in which a predetermined normal flow is maintained. It is evident therefore that the lower the flow velocity of a solution passing through a compartment, the lower the permissible current density. Moreover, if one compartment out of as many as several hundred compartments in a unit has a lower flow rate than any of the other compartments, that one compartment limits the allowable current density, and sets the over-all demineralization rate to a value lower than would be the case if all compartments were receiving their flow of electrolyte solutions at the predetermined normal rate.

Maintenance of a suitable uniform flow rate for the electrolyte solutions in the respective compartments, is contingent principally upon an effective control of the hydraulic resistance to their flow. Because of the unpredictable dimensional changes of the ion-selective membranes, it is almost impossible to form the solution compartments so that the hydraulic resistance of each compartment is made the same as that for any other compartment. Moreover, this difficulty is often intensified since many of the generally available membranes have a tendency to cold-flow or creep under the influence of unbalanced hydraulic pressures. By means of the present invention the hydraulic resistance in the compartmented structures of a unit is made a minor and insignificant part of the total hydraulic resistance to the flow of the electrolyte solutions such that dimensional changes in the membranes do not have any substantial effect upon the flow rate of the solutions in the compartments. For this purpose most of the total resistance to solution flow is engendered in the improved solution distributing devices which are intimately associated with the structure and form of the compartments' membrane walls. Individual parts of these distributing devices can be mass produced by known techniques with excellent quality control whereby the hydraulic resistance offered by any solution distributing device of the arrangement would be the same as that offered by any other such device. Since the indeterminate variations in hydraulic resistance due to the dimensional changes in the membrane walls can thereby be made to affect the total hydraulic resistance to flow only slightly, the attainment of essentially equal uniform rates of solution flow through the individual compartments becomes feasible.

A structural arrangement particularly adapted to utilize the improved liquid distributing devices according to the invention, is disclosed in the patent application of Robert E. Lacey et al., Ser. No. 266,768, filed Mar. 20, 1963, and assigned to the assignee of the present case Tubular conduits of this arrangement are provided with openings around which are positioned the improved devices such that they are individually located between and in contact with the membrane walls of the separate compartments thereof. A pair of collar-like sleeves flexibly supported on each such conduit, maintain the latter for adjustment in openings through outer walls supporting the arrangement, whereby these sleeves also act to clamp together the various devices and the membranes situated between them in an aligned array along the conduit. In this manner the devices are effective to seal the openings in the membranes through which the conduits pass, and provide suitable passages along which the solutions directed thereto are uniquely distributed to the compartments under a predetermined hydraulic resistance.

It is therefore an object of the present invention to provide liquid distributing devices through whose channels the solutions received in the compartmented structure of a liquid purification unit, flow against predetermined, substantially uniform hydraulic resistance.

This and other objects and advantages of the invention will be more readily understood from the following detailed description of preferred embodiments of the invention, considered together with the accompanying drawings wherein.

Figure 1:
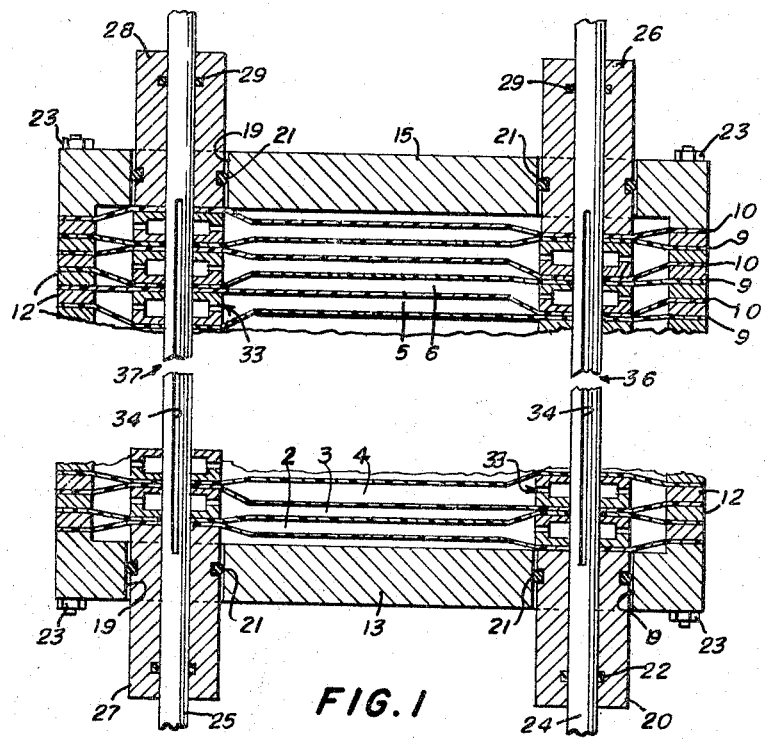
FIG. 1 is a fragmentary sectional view through a por-

Referring to FIG. 1, a multi-cell electrodialysis unit according to one embodiment of the present invention is shown comprising a plurality of ion-selective membranes 9 and 10, individually gripped completely about their edges, between relatively narrow enclosing strips comprising rectangular frames 12. The frames with the membranes supported therein, are arrayed in a standing stacked alignment between relative thicker end plates 13 and 15. These plates are tied together by nuts 23 on threaded rods passing through the entire stack whereby the latter is clamped together to fashion the basic figuration of the unit. However, the frames are essentially gaskets sealing the membranes along their edges to define spaces enclosed between the membranes, constituting a multiplicity of narrow envelope-like cells or compartments 2, 3, 4, 5, 6, etc. Aligned pairs of openings 19, through each of the end plates 13 and 15 are spacially arranged thereon to appropriately position a plurality of solutions transmitting devices for cooperation with the multiplicity of compartments. Secured in each of the end plate openings is a sleeve-like coupling which provides a flexible connection between a tubular element constituting a solution transmitting conduit, and the end plate.

As shown in FIG. 1, coupling sleeve 20 (shown in section) fits within an opening 19, in end plate 13. An O-ring 21, retained in a narrow track around the outer surface of coupling sleeve 20, forms a flexible seal between the sleeve and plate 13. This coupling structure is effective to seal the end plate opening, as well as to maintain itself in an adjusted position for clamping together solution distributing and indexing devices positioned between the membranes 9 and 10, for a purpose more fully explained hereinafter. Couplings maintained in the aligned openings 19 of the end plate 13 act conjointly with the coupling members arranged opposite thereto in end plate 15 to support within their central openings the tubular conduits adapted to carry solutions to and from the unit. For example, the tubular conduits 24 and 25 shown in FIG. 1 are supported in coupling sets 20, 26, and 27, 28, respectively, located in a lower portion of the unit. O-rings used within the respective couplings to seal the passages containing the conduits, also act to suitable maintain the conduits in adjusted position. Conduit 24 for example, is maintained extended between openings 19 in the end plates 13 and 15 by means of O-rings 22 and 29, retained in groove-like tracks within the couplings 20 and 26, respectively. Suitably located holes provided in each of the multiplicity of membranes 9 and 10, accommodate the conduits 24 and 25, to pass neatly therethrough without distorting or stressing the fabric of the membranes.

After the solutions from the tubular conduits 24 and 25 are supplied to the multiplicity of compartments, they pass upward through the compartments and are withdrawn through further conduits supported at an upper part of the unit. The manner in which these further conduits, which are not shown on the drawings, are formed and arranged in the outer end walls 13 and 15, is substantially the same as that already described for the conduits 24 and 25. Facilitating the flow of solutions into the compartments are separate manifold assemblies 36 and 37. Each of these manifolds comprises a series of the solution distributing devices 33 supported on the tubular conduit associated therewith such that each such device singularly assumes an operative position within each of the membrane compartments. A straight narrow slot in each conduit extends approximately the full length thereof between and within the end plates 13 and 15. The open passage through the slot in the respective conduits completes a path along which the solutions flow to or from a conduit whereby they are enabled to traverse the devices on the associated manifold assembly and pass between the membranes of the compartments.

Figure 2:
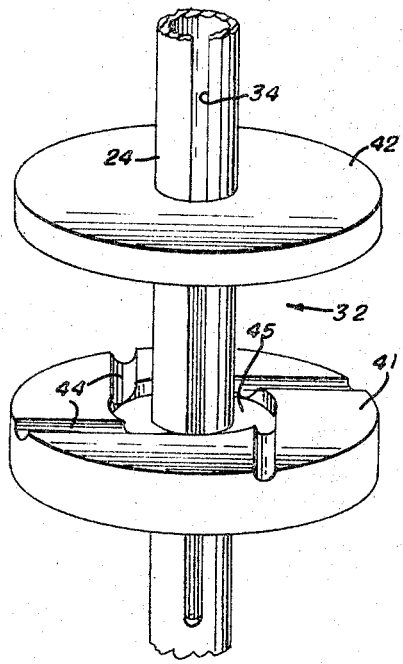
FIG. 2 is a perspective view of elemental parts comprising a solution manifolding assembly, illustrating one form of the solution distributing devices.

The flow path for solution passing between any conduit slot and a compartment becomes evident with reference to FIG. 2 illustrating the structural details of one of the improved distributing devices 32. In FIG. 2 a device 32 is shown axially supported on a tubular element such as the conduit 24, which passes through central openings in the separate parts of the device. These parts include a channeling disk 41, and a washer-like cover disk 42, which encircle the conduit, crossing over the extended solution inlet slot 34 opening into the conduit. When disks 41 and 42 are in contact and operatively positioned in the manner indicated by FIG. 1, they enclose between them a number of narrow grooves 44, and a central concavity or pocket 45 molded into the disk 41. Grooves 44 thereby constitute ducts which join the pocket 45 to provide a plurality of off-centered channels which are in position to direct the flow of solution received in the pocket 45 from the slot 34, to beyond the peripheral edge of the distributing device 32. Also evident in this construction is a means into which solution flowing from a compartment will drain and be directed through a device 32 and the grooved channels and annular pocket thereof, into a slot of a conduit carrying solution out of the unit. Moreover, since liquid solution filling an annular pocket 45, is at the same time part of the liquid flow in all the channels of the device, a predetermined alignment between the slot in the conduit and any of the grooves 44 becomes unnecessary to insure unrestricted flow of solution through the liquid transmitting parts.

Figure 3:
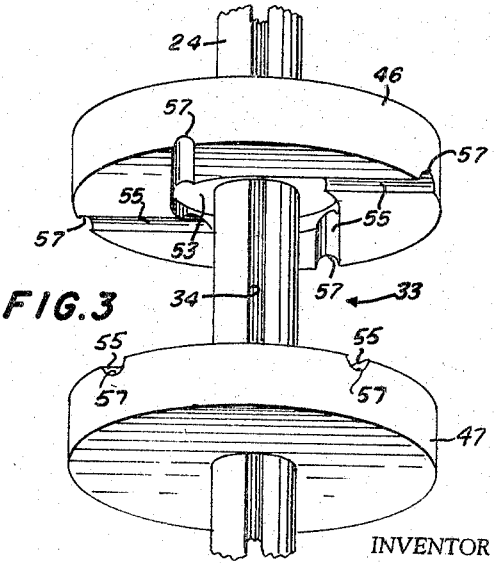
FIG. 3 is another perspective view also showing parts of a manifolding assembly, but comprising a second form of the solution distribuing devices.

A modified solution distributing device 33 as shown in FIG. 3, can be made effective to provide a broader or fuller flow to or from the compartments. This form of the device includes two molded channeling disks 46 and 47, which like the disks previously described, are also mounted on a conduit 24, to encircle it and cross over its extended slot 34. However, each of the instant disks is formed in the same way to comprise a central concavity or pocket 53, and off-centered or non-radial grooves 55 which join the central pocket to openings 57 spaced around the peripheral edge of the disk. As indicated previously, the presence of the central pocket 53 in a disk, avoids the necessity of indexing or keying the disks to the slot 34 in the tubular conduit 24. Solution will flow from the slot into the pocket 53 and out through the grooved channels 55, regardless of their position in respect to the slots. The non-radial characteristic of the grooved channels 55 permits any of the molded disks such as the disks 46 and 47, to be placed together face to face as shown in FIG. 1, without fear that the grooves will coincide. It is evident that if the grooves could coincide, the hydraulic pressure drop through each device may differ from that of others depending on the coincidence or lack of coincidence of the grooves.

In order to function as required, the apparatus hereinabove described, must be arranged to operatively associate every other solution compartment thereof with manifolding structure supplying them with the same solution. For example, even numbered compartments in a series would receive only solution to be diluted or purified (P solution), and the adjacent compartments, the odd-numbered ones, would receive only solution to be concentrated or enriched (S solution). Separate manifolding assemblies are therefore necessary such that one assembly is provided to interconnect all even-numbered compartments, and another assembly is provided to interconnect all odd-numbered compartments. Moreover, since the distributing devices in the unit of the preferred embodiment can thus each be twice as thick as the thickness of its compartments, the component disks of the devices can be made suitably thick to withstand critical pressures and stresses which are likely to be applied to them.

Manifolding assemblies 36 and 37, as shown in FIG. 1, supply the requisite solutions to the even-numbered, and odd-numbered compartments, respectively. Since the compartments of the unit are formed by alternately arranged cation-permeable membranes 9, and anion-permeable membranes 10, the compartments 2, 4, 6, etc., are operatively associated with manifolding assembly 36 supplying the diluting or P solution thereto, and the compartments 3, 5, etc., are operatively associated with manifolding assembly 37 supplying the concentrating S solution thereto. After the P solution flows between the membranes of the even-numbered compartments, it drains through the distributing devices 33 of an upper manifolding assembly, and leaves the unit in a tubular conduit associated therewith. Similarly, after the S solution flows between the membranes of the odd-numbered compartments, it drains through the devices 33 of another upper manifolding assembly, and leaves the unit in the tubular conduit operative therein.

The cross-over or counterflow of the P and S solutions within adjacent compartments of the multiplicity thereof in the unit, is achieved by utilizing the distributing devices 32 or 33 to uniquely index and align the membranes forming the compartments. As seen in FIG. 1, this construction provides that the P solution inlet manifolding 36 clamp only a membrane 9 between its first device 33 and the inner end of coupling 20, whereas the S solution inlet manifolding 37 clamp a membrane 9 and a membrane 10 between its first device 33, and the inner end of coupling 27. Thereafter the subsequent adjacent devices 33 of the manifolding assemblies 36 and 37, have clamped between them, a membrane 9 and a membrane 10, and the particular devices 33 at the very end of the respective manifolds, clamp membranes 9 and 10, and a single membrane 10, to the inner ends of couplings 26 and 28, respectively. The upper manifolding assemblies providing outlet paths for the P and S solutions respectively, differ from their corresponding inlet manifolding arrangements for clamping the membranes, in exactly the same way as the latter arrangements differ from one another.

A further significant advantage gained by the use of the device 32 or 33 to index and align the compartments, is that the coupling sets supporting the conduits, may be conveniently adjusted relative to the end plates 13 and 15, to apply separate clamping pressure to each row of the devices having the membranes between them. As a result, any leaks from around the edges of the holes in the membranes in which the conduits pass, may be stopped by merely applying more clamping pressure on the row of devices in which the leak occurred, without thereby placing any other row of devices under undue pressure that might tend to rupture the membranes.

While preferred embodiments of the invention have been illustrated and described herein, it is to be understood that the invention is not limited thereby, but is susceptible to change in form and detail.

What is claimed is:

1. In a solution treatment apparatus, a multiplicity of generally parallel ion membranes defining thin walled receptacles in a compartmented arrangement, the receptacles being individually adapted to receive and discharge a solution and have intimately associated therewith input and output solution distributing assemblies which are respectively operative to facilitate supplying and withdrawing the solutions of the said individual receptacles, each solution distributing assembly comprising an integral manifolding duct element having an extended opening therein, said duct element extending longitudinally through aligned openings in the membranes of said receptacles, a multiplicity of solution channeling devices supported on said duct element over said extended opening thereof in an arrangement aligned with said membrane openings whereby each device individually resides within a separate one of said receptacles in contact with membranes about the said openings, each of said devices comprising the improvement and including two separate elements in contact, an axial cavity enclosed within each said elements, a plurality of channels extending in several directions from said cavity to openings at the outer edges of the elements, both said elements having corresponding central openings in which the duct element is maintained to pass through said enclosed cavity, and said outer edge openings being in communication with said receptacle containing the device wherein said channels complete flow paths between said duct element and said receptacle through said extended opening in said duct element, and said enclosed cavity of the device.

2. The solution treatment apparatus of claim 1, wherein the separate elements of each of said devices comprise a channeling disk in one surface of which is formed the said annular cavity and said plurality of channels, and a further disk having a relatively broad flat surface contiguous to the channeling disk and adapted to cover over its formed surface.

3. The solution treatment apparatus of claim 1, wherein concavities in the contacting surfaces of the separate elements of each device are aligned to open into each other to form the said annular cavity, and complementary numbers of said plurality of channels are formed in the respective elements of each device.

4. The solution treatment apparatus of claim 3, wherein the channels in each of said elements intersect and open into the concavity therein, at approximate tangents.

References Cited

UNITED STATES PATENTS

| | | | |
|---|---|---|---|
| 2,686,154 | 8/1954 | MacNeill | 210—321 |
| 2,689,826 | 9/1954 | Kollsman | 204—257 |
| 2,758,083 | 8/1956 | Van Hoek et al. | 204—301 |
| 2,980,598 | 4/1961 | Stoddard | 204—257 |
| 3,051,316 | 8/1962 | McNeill | 204—301 |
| 3,085,970 | 4/1963 | Davis | 204—301 |

FOREIGN PATENTS 73,924  1/1954  Holland.

JOHN H. MACK, *Primary Examiner.*

J. R. SPECK, *Examiner.*

G. BATTIST, R. MIHALEK, *Assistant Examiners.*